United States Patent
He et al.

(10) Patent No.: US 11,043,101 B2
(45) Date of Patent: Jun. 22, 2021

(54) MULTI-SYSTEM, MULTI-PARAMETER, INTEGRATED, COMPREHENSIVE EARLY WARNING METHOD AND SYSTEM FOR COAL AND ROCK DYNAMIC DISASTER

(71) Applicants: University of Science and Technology Beijing, Beijing (CN); Zhong-an Academy of safety Engineering, Beijing (CN)

(72) Inventors: Xueqiu He, Beijing (CN); Dazhao Song, Beijing (CN); Shengquan He, Beijing (CN); Zhenlei Li, Beijing (CN); Yarong Xue, Beijing (CN); Anhu Wang, Beijing (CN); Hongwei Mu, Beijing (CN)

(73) Assignees: UNIVERSITY OF SCIENCE AND TECHNOLOGY BEIJING, Beijing (CN); ZHONG-AN ACADEMY OF SAFETY ENGINEERING, Beijing (CN)

( * ) Notice: Subject to any disclaimer, the term of this patent is extended or adjusted under 35 U.S.C. 154(b) by 0 days.

(21) Appl. No.: 16/820,751

(22) Filed: Mar. 17, 2020

(65) Prior Publication Data
US 2021/0134135 A1 May 6, 2021

(30) Foreign Application Priority Data
Oct. 30, 2019 (CN) .......................... 201911047938.8

(51) Int. Cl.
G08B 21/10 (2006.01)
G01V 1/28 (2006.01)
E21F 17/18 (2006.01)

(52) U.S. Cl.
CPC .............. *G08B 21/10* (2013.01); *E21F 17/18* (2013.01); *G01V 1/288* (2013.01)

(58) Field of Classification Search
CPC ........ G08B 21/10; E21F 17/18; E21F 17/185; E21F 17/00; G01V 1/288
See application file for complete search history.

(56) References Cited

FOREIGN PATENT DOCUMENTS

| CN | 102628373 A | * | 8/2012 |
| CN | 103291364 B | * | 8/2015 |

(Continued)

*Primary Examiner* — Brian Wilson
(74) *Attorney, Agent, or Firm* — Bayramoglu Law Offices LLC

(57) ABSTRACT

A multi-system, multi-parameter, integrated, comprehensive early warning method for a coal and rock dynamic disaster includes: obtaining monitoring data of a plurality of monitoring systems for the coal rock dynamic disaster, and extracting multivariate characteristic parameters capable of reflecting precursor information of the coal and rock dynamic disaster in each monitoring system based on the monitoring data; screening out a combination of characteristic parameters with a highest early warning effectiveness in each monitoring system and an optimal critical value of each characteristic parameter based on the multivariate characteristic parameters; calculating a comprehensive early warning index and an early warning effectiveness of each monitoring system; and calculating a multi-system comprehensive early warning result of the coal and rock dynamic disaster based on the comprehensive early warning index and the early warning effectiveness of each monitoring system.

10 Claims, 6 Drawing Sheets

(56) References Cited

FOREIGN PATENT DOCUMENTS

| CN | 106194263 A | * | 12/2016 | ............... | E21F 17/18 |
| CN | 105257339 B | * | 10/2017 | ............... | E21F 12/18 |

* cited by examiner

MULTI-SYSTEM, MULTI-PARAMETER, INTEGRATED, COMPREHENSIVE EARLY WARNING METHOD AND SYSTEM FOR COAL AND ROCK DYNAMIC DISASTER

CROSS REFERENCE TO THE RELATED APPLICATIONS

This application is based upon and claims priority to Chinese Patent Application No. 201911047938.8, filed on Oct. 30, 2019, the entire contents of which are incorporated herein by reference.

TECHNICAL FIELD

The present invention relates to the field of early warning technology of coal and rock dynamic disaster, and more particularly, to a multi-system, multi-parameter, integrated, comprehensive, early warning method and system for a coal and rock dynamic disaster.

BACKGROUND

Coal and rock dynamic disasters are a common type of disaster in coal mines and are very destructive. In a coal and rock dynamic disaster, the most undesirable result is shaft and roadway closure with large volumes of coal and rock mass ejected. Such conditions result not only in environmental and economic loss but also loss to person and property. Most mines where operations have been long-term include deep mining as part of their operations. Deep mining presents an increase in the frequency and intensity of coal and rock dynamic disasters. The reasons for coal and rock dynamic disasters are complex and dynamic, which brings challenges to monitoring, early warning, prevention and control. An accurate and efficient monitoring and early warning method has, therefore, become a major focus for identifying disaster risks in coal mines in advance, taking control measures, and ensuring safe production.

At present, real-time monitoring methods for coal and rock dynamic disasters in mines typically include micro-seismic monitoring, earth sound monitoring, support stress monitoring and electromagnetic radiation monitoring. Each of the current disaster monitoring and forecasting methods have limitations. Micro-seismic monitoring is mainly aimed at low-frequency/high-energy events, and is employed in large-scale area monitoring to realize the temporal-order monitoring of high-scale coal and rock fractures as well as the spatial location of rupture sources. Earth sound monitoring is mainly aimed at high-frequency/low-energy events, and can realize the local monitoring of low-scale coal and rock micro-fractures and the monitoring range of the sensors typically used is about 30 m. Support stress monitoring is limited to monitoring only the ceiling weight of the stope support. Electromagnetic radiation monitoring can monitor the stress concentration and the fracture of the interior of coal and rock mass concurrently, and the monitoring range can reach 20 m. Due to different monitoring methods and limitations of the equipment associated with them, however, early warning results of multi-source monitoring data obtained from heretofore monitoring methods and equipment may be inconsistent, which results in inefficient use of instruments and equipment and inaccuracies. False alarms are a common problem. There is, therefore, a need for further analyzing the data generated from current monitoring systems to improve data accuracy. Such data analytics should also improve the accuracy of early warnings and the safety of underground production.

SUMMARY

In order to overcome existing disadvantages in the above-mentioned prior art, the present invention provides a multi-system, multi-parameter, integrated, comprehensive early warning method and system for a coal and rock dynamic disaster. The method and system of the invention analyzes the monitoring data of each monitoring system, organically integrates the monitoring and early warning information obtained, and constructs a multi-system, multi-parameter, integrated, comprehensive monitoring and early warning model, thereby forming an integrated, comprehensive, highly reliable early warning method with a unified early warning criteria, a unified early warning indicator and a unified early warning critical value. In this way, the early warning accuracy of coal and rock dynamic disasters is improved, the frequency of false alarms is reduced, thereby substantially contributing to the prevention and control of mine disasters.

To solve the above technical problems, the present invention provides a multi-system, multi-parameter, integrated, comprehensive early warning method for a coal and rock dynamic disaster, wherein the multi-system, multi-parameter, integrated, comprehensive early warning method for the coal and rock dynamic disaster includes:

obtaining monitoring data from a plurality of monitoring systems for the coal rock dynamic disaster, and extracting multivariate characteristic parameters capable of reflecting precursor information of the coal and rock dynamic disaster in each monitoring system based on the monitoring data;

screening out a combination of characteristic parameters with a highest early warning effectiveness in each monitoring system and an optimal critical value of each characteristic parameter based on the multivariate characteristic parameters;

calculating a comprehensive early warning index and an early warning effectiveness of each monitoring system based on the combination of the characteristic parameters with the highest early warning effectiveness in each monitoring system and the optimal critical value of each characteristic parameter; and calculating a multi-system comprehensive early warning result of the coal and rock dynamic disaster based on the comprehensive early warning index and the early warning effectiveness of each monitoring system.

Further, after calculating the multi-system comprehensive early warning result of the coal and rock dynamic disaster, the method further includes:

comparing the multi-system comprehensive early warning result of the coal and rock dynamic disaster with a classification early warning evaluation criteria of the coal and rock dynamic disasters to determine a risk level of the dynamic disaster.

As preferred, the monitoring systems include on-line monitoring systems and portable monitoring systems, wherein the on-line monitoring systems include a micro-seismic monitoring system, an earth sound monitoring system and a hydraulic support monitoring system.

As preferred, the monitoring data include continuous monitoring data collected by the on-line monitoring systems and discrete monitoring data collected by the portable monitoring systems.

As preferred, dimensions of the multivariate characteristic parameters include a time dimension, a space dimension and an intensity dimension, the multivariate characteristic parameters include:

in the micro-seismic monitoring system, a frequency, a frequency ratio and a frequency deviation which reflect temporal order information; dispersion which reflects spatial information; micro-seismic energy, a micro-seismic energy deviation and dispersion which reflect intensity information;

in the earth sound monitoring system, earth sound energy, an earth sound energy deviation, an earth sound energy average value and a pulse factor, which reflect the intensity information; a pulse which reflects the temporal order information; and in the hydraulic support monitoring system, a flicker interval risk degree which reflects the temporal order information; a recording frequency and support pressure which reflect the intensity information.

Further, the step of screening out the combination of the characteristic parameters with the highest early warning effectiveness in each monitoring system and the optimal critical value of each characteristic parameter includes:

performing a pairwise combination on characteristic parameters belonging to different dimensions in the same monitoring system;

adopting a genetic algorithm to train and select a combination of characteristic parameters with a highest fitness value in each monitoring system, and calculating an optimal critical value of each characteristic parameter;

taking the combination of the characteristic parameters with the highest fitness value in each monitoring system as the combination of the characteristic parameters with the highest early warning effectiveness corresponding to each monitoring system.

Further, when the genetic algorithm is adopted to train and select the combination of the characteristic parameters with the highest fitness value in each monitoring system, the first two groups of the combinations of the characteristic parameters with the highest fitness value are selected in the micro-seismic monitoring system; and one group of the combination of the characteristic parameters with the highest fitness value corresponding to each sensor is selected in the earth sound monitoring system and the hydraulic support monitoring system.

Further, the step of calculating the comprehensive early warning index and the early warning effectiveness of each monitoring system based on the combination of the characteristic parameters with the highest early warning effectiveness in each monitoring system and the optimal critical value of each characteristic parameter includes:

based on the combination of the characteristic parameters with the highest fitness value in each monitoring system and the optimal critical value of each characteristic parameter, calculating a single system early warning degree of each monitoring system according to the following formula:

$$W_i = \begin{cases} 0, & a_i < V_1 \;\&\; b_i < V_2 \\ 1, & a_i < V_1 \text{ or } b_i < V_2 \\ 2, & a_i > V_1 \;\&\; b_i > V_2 \end{cases}$$

wherein, for the micro-seismic monitoring system, the single system early warning degree is an early warning degree of each group of the combination of the characteristic parameters with the highest fitness value, wherein, $W_i$ represents an early warning degree of an $i^{th}$ group of the combination of the characteristic parameters with the highest fitness value, $a_i$ and $b_i$ represent real-time values of two characteristic parameters in the $i^{th}$ group of the combination of the characteristic parameters with the highest fitness value, respectively, and $V_1$ and $V_2$ represent the optimal critical values corresponding to each characteristic parameter in the $i^{th}$ group of the combination of the characteristic parameters with the highest fitness value, respectively;

for the earth sound monitoring system and the hydraulic support monitoring system, the single system early warning degree is an early warning degree of each sensor, wherein, $W_i$ represents an early warning degree of an $i^{th}$ sensor, $a_i$ and $b_i$ represent the real-time values of two characteristic parameters in the combination of the characteristic parameters with the highest fitness value corresponding to the $i^{th}$ sensor, respectively, and $V_1$ and $V_2$ represent the optimal critical values corresponding to each characteristic parameter in the combination of the characteristic parameters with the highest fitness value corresponding to the $i^{th}$ sensor, respectively;

based on the single system early warning degree of each monitoring system, calculating a comprehensive early warning index $W_C$ of each monitoring system according to the following formula:

$$W_C = \sum \left( \frac{W_i}{\max(W_i)} \times \frac{R_i}{\sum R_i} \right)$$

wherein, for the micro-seismic monitoring system, $R_i$ represents a fitness value of the $i^{th}$ group of the combination of the characteristic parameters with the highest fitness value; for the earth sound monitoring system and the hydraulic support monitoring system, $R_i$ represents a fitness value of the combination of the characteristic parameters with the highest fitness value corresponding to the $i^{th}$ sensor;

based on the comprehensive early warning index of each monitoring system, calculating an early warning effectiveness $R_I$ of each monitoring system according to the following formula, wherein $R_I$ represents an early warning effectiveness of the $I^{th}$ monitoring system:

$$R_I = \frac{n_1^1}{N_1} - \frac{t_0}{T_0}$$

wherein, $n_1^1$ represents a number of times of early warnings generated and alarmed rightly in a monitoring time; $N_1$ represents a total number of times of events with large energy or shock in the monitoring time; $t_0$ is time taken to generate an early warning; $T_0$ is total monitoring time; when the comprehensive early warning index corresponding to the monitoring system exceeds a preset threshold within preset days before the event with large energy or shock occurs, the early warning is right, otherwise the early warming is false Further, the step of calculating the multi-system comprehensive early warning result of the coal and rock dynamic disaster based on the comprehensive early warning index and the early warning effectiveness of each monitoring system includes:

based on the comprehensive early warning index and the early warning effectiveness of each monitoring system, calculating the multi-system comprehensive early warning result $I_C$ of the coal and rock dynamic disaster according to the following formula:

$$I_C = \sum \left( \frac{W_{CI}}{\max(W_{CI})} \times \frac{R_I}{\sum R_I} \right)$$

wherein, $W_{CI}$ represents a comprehensive early warning index of the $I^{th}$ monitoring system, and $R_I$ represents an early warning effectiveness of the $I^{th}$ monitoring system.

In order to solve the above technical problems, the present invention provides a multi-system multi-parameter integrated comprehensive early warning system for a coal and rock dynamic disaster, wherein the multi-system multi-parameter integrated comprehensive early warning system for the coal and rock dynamic disaster includes:

a multivariate characteristic parameter extracting module, configured to obtain monitoring data of a plurality of monitoring systems for the coal rock dynamic disaster, and extract multivariate characteristic parameters capable of reflecting precursor information of the coal and rock dynamic disaster in each monitoring system based on the monitoring data;

a characteristic parameter combination screening module, configured to screen out a combination of characteristic parameters with a highest early warning effectiveness in each monitoring system and an optimal critical value of each characteristic parameter based on the multivariate characteristic parameters;

a single system early warning index and early warning effectiveness calculation module, configured to calculate a comprehensive early warning index and an early warning effectiveness of each monitoring system based on the combination of the characteristic parameters with the highest early warning effectiveness in each monitoring system and the optimal critical value of each characteristic parameter; and a comprehensive early warning result calculation module, configured to calculate a multi-system comprehensive early warning result of the coal and rock dynamic disaster based on the comprehensive early warning index and the early warning effectiveness of each monitoring system.

The advantages of the above technical solution of the present invention are as follows.

The monitoring data obtained the device in a micro-seismic monitoring system, an earth sound monitoring system, a support stress monitoring system and other monitoring system are comprehensively evaluated and analyzed to obtain the early warning characteristic parameters of each system; a pairwise combination of characteristic parameters in each monitoring system is input into a genetic algorithm to obtain the optimal critical value $V_1$, $V_2$ and the corresponding fitness value of the combination of the characteristic parameters, and a combination of the characteristic parameters with the highest fitness value is selected as the combination of the characteristic parameters corresponding to each monitoring system; an early warning degree $W_i$ and a comprehensive early warning index $W_C$ of each single system are calculated, and an early warning effectiveness RI of each single system is obtained by the R-value evaluation method; finally, a multi-system comprehensive early warning result of the coal and rock dynamic disaster is calculated to determine the current risk degree of the coal and rock dynamic disaster and the measures taken. The method combines advantages of the plurality of monitoring systems, improves the accuracy of early warning and removes the influence of subjective factors, which can play a guiding role in the prevention and control of mine disasters.

DETAILED DESCRIPTION OF THE EMBODIMENTS

In order to illustrate the technical problems to be solved, technical solutions and advantages of the present invention clearly, a detailed description is provided in combination with the drawings and specific embodiments.

First Embodiment

Figure 1:
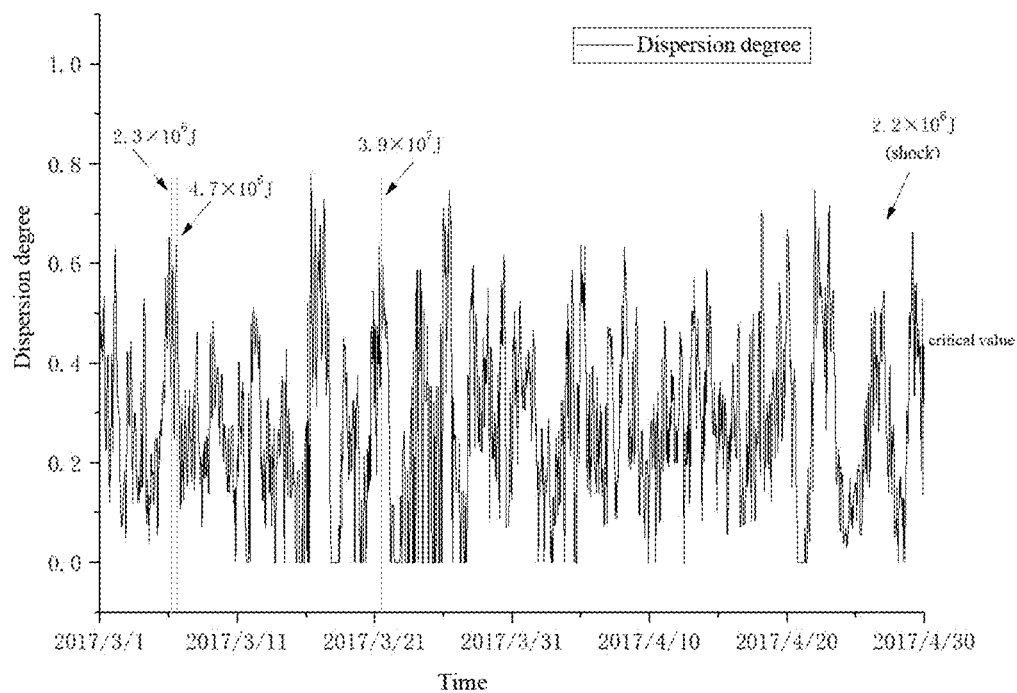
FIG. 1 shows a temporal order variation curve of the dispersion.
Figure 2:
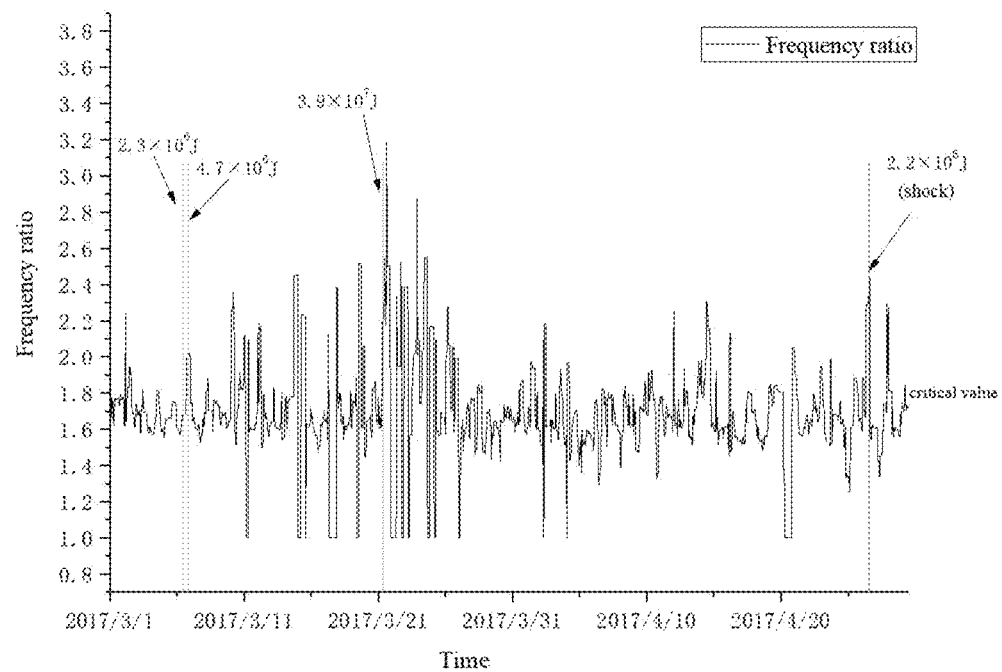
FIG. 2 shows a temporal order variation curve of the frequency ratio.
Figure 3:
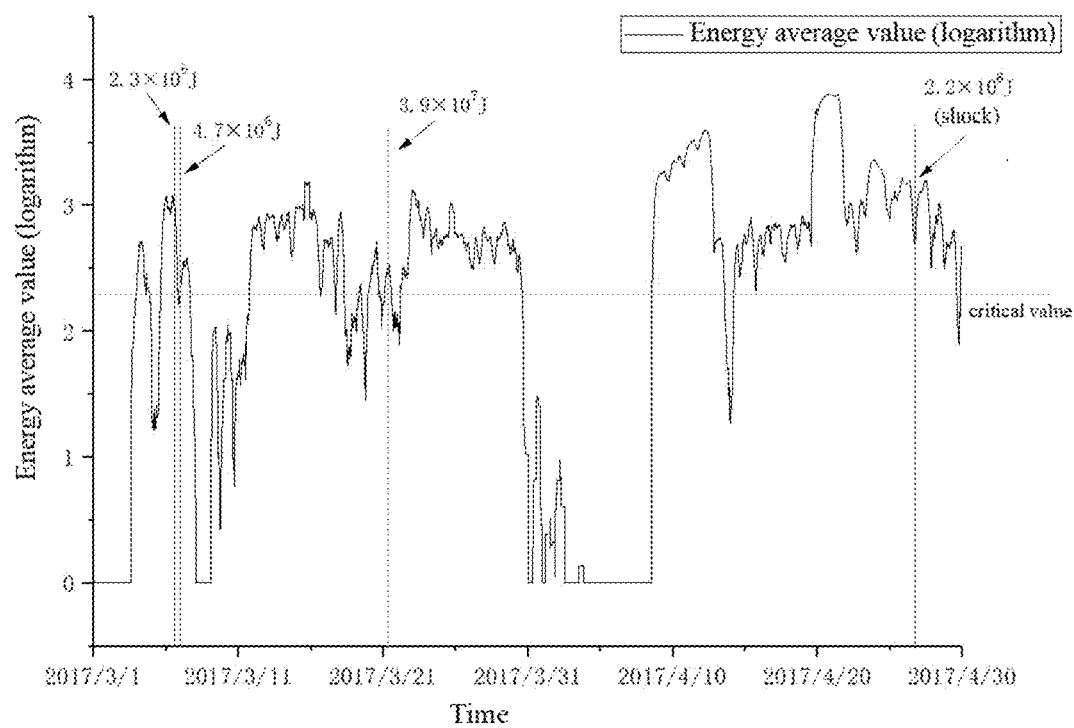
FIG. 3 shows a temporal order variation curve of the energy deviation.
Figure 4:
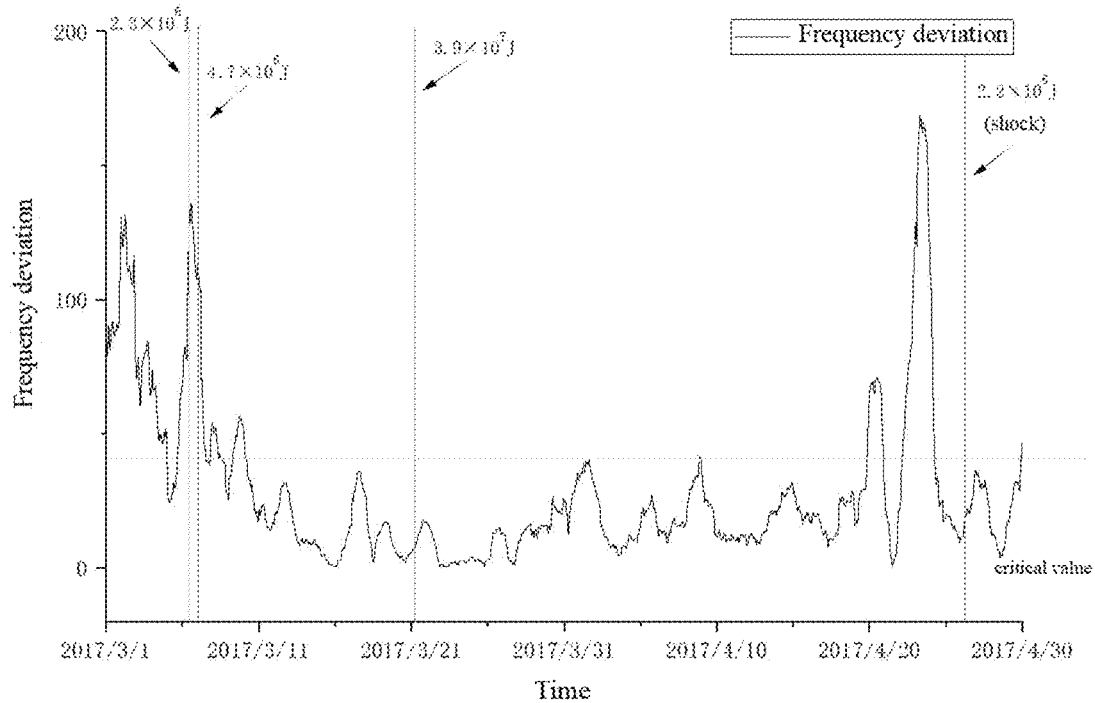
FIG. 4 shows a temporal order variation curve of the frequency deviation.
Figure 5:
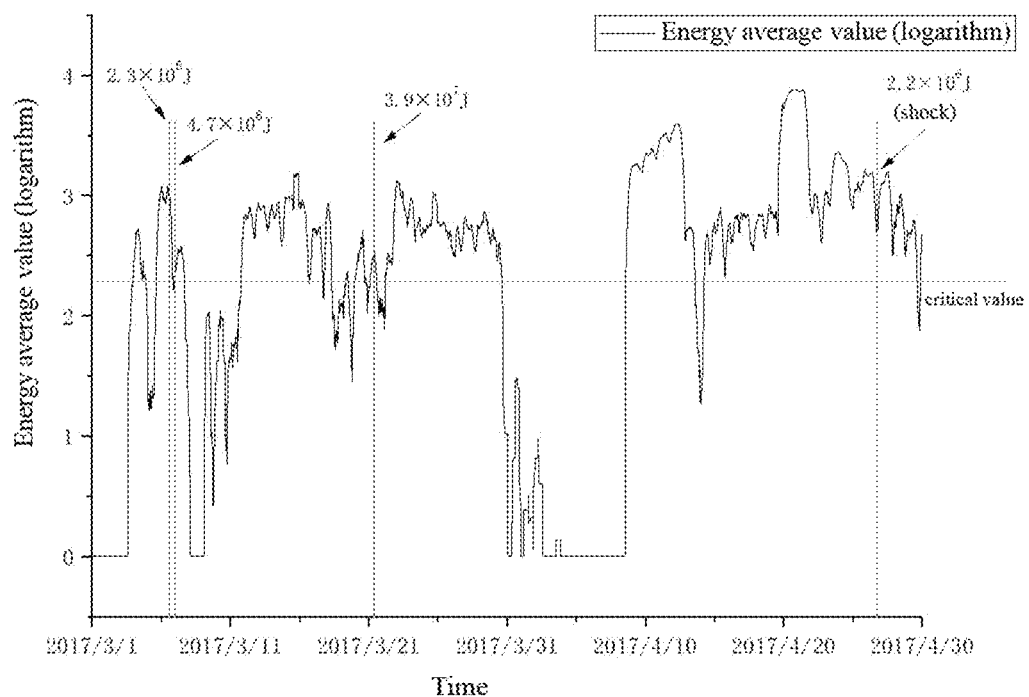
FIG. 5 shows a temporal order variation curve of the energy average value (logarithm).
Figure 6:
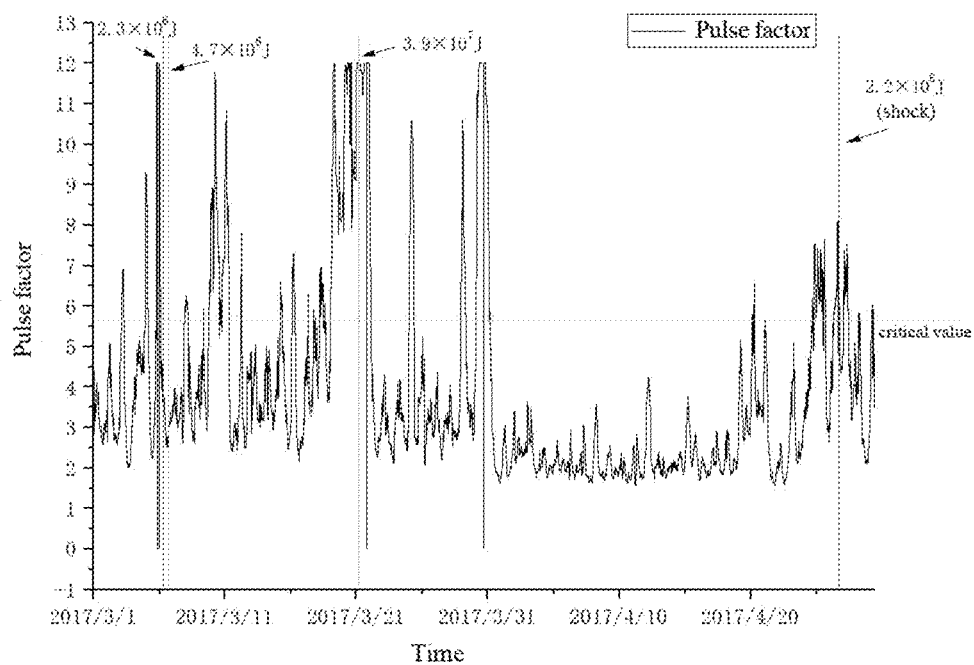
FIG. 6 shows a temporal order variation curve of the pulse factor.
Figure 7:
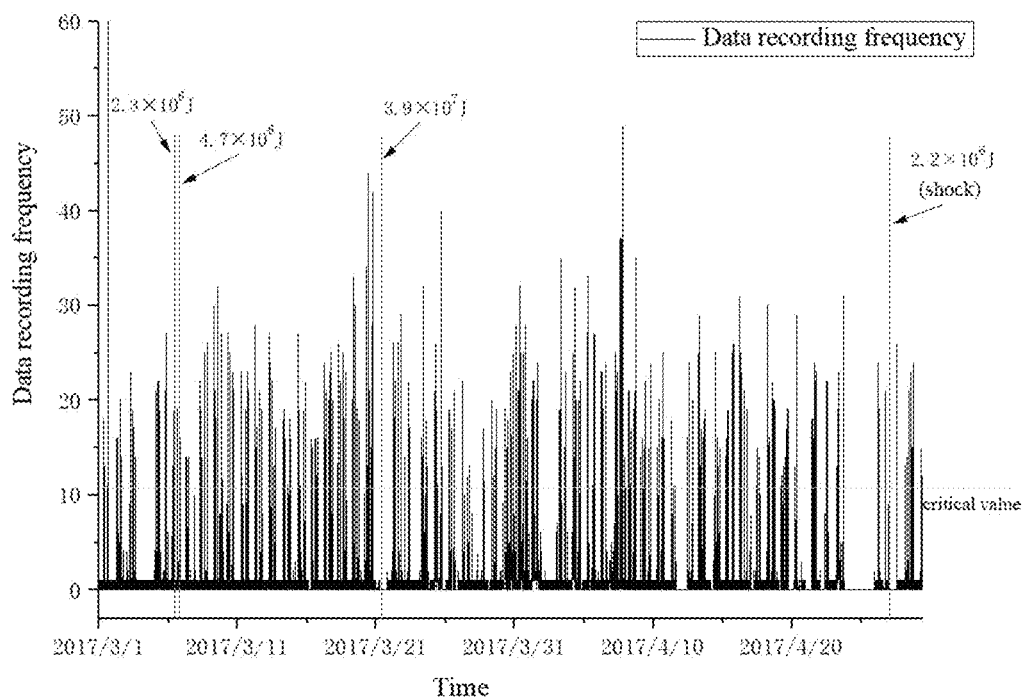
FIG. 7 shows a temporal order variation curve of the recording frequency.
Figure 8:
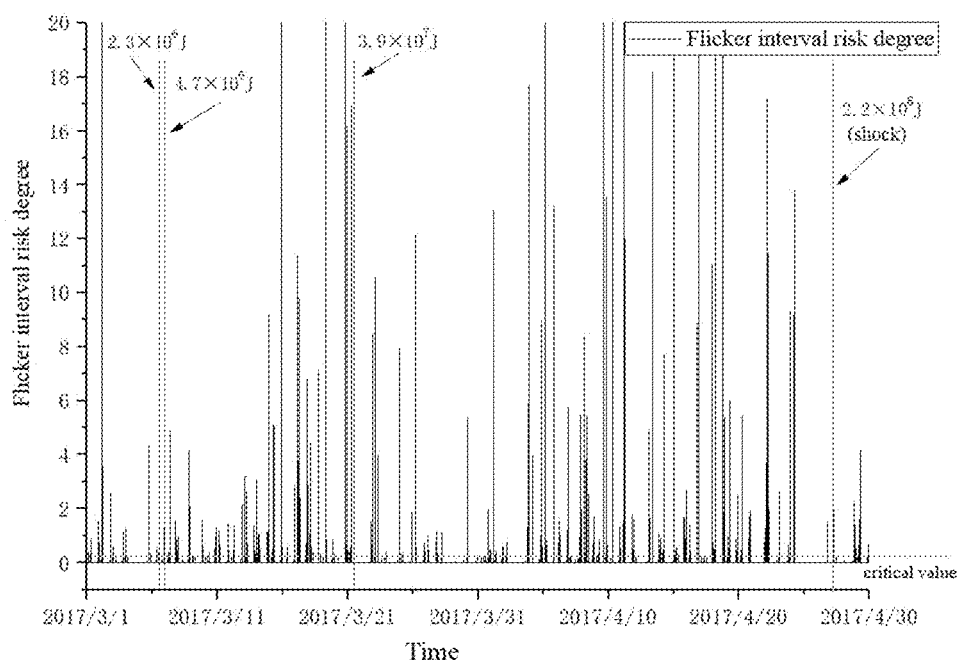
FIG. 8 shows a temporal order variation curve of the flicker interval risk degree.
Figure 9:
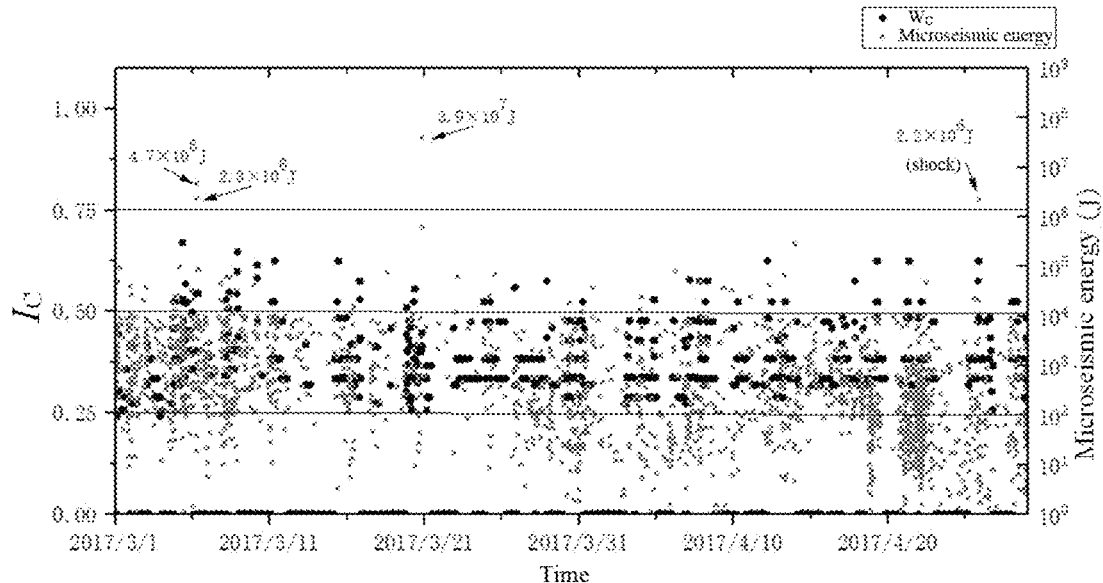
FIG. 9 shows the results of multi-system integrated early warning.
Figure 10:
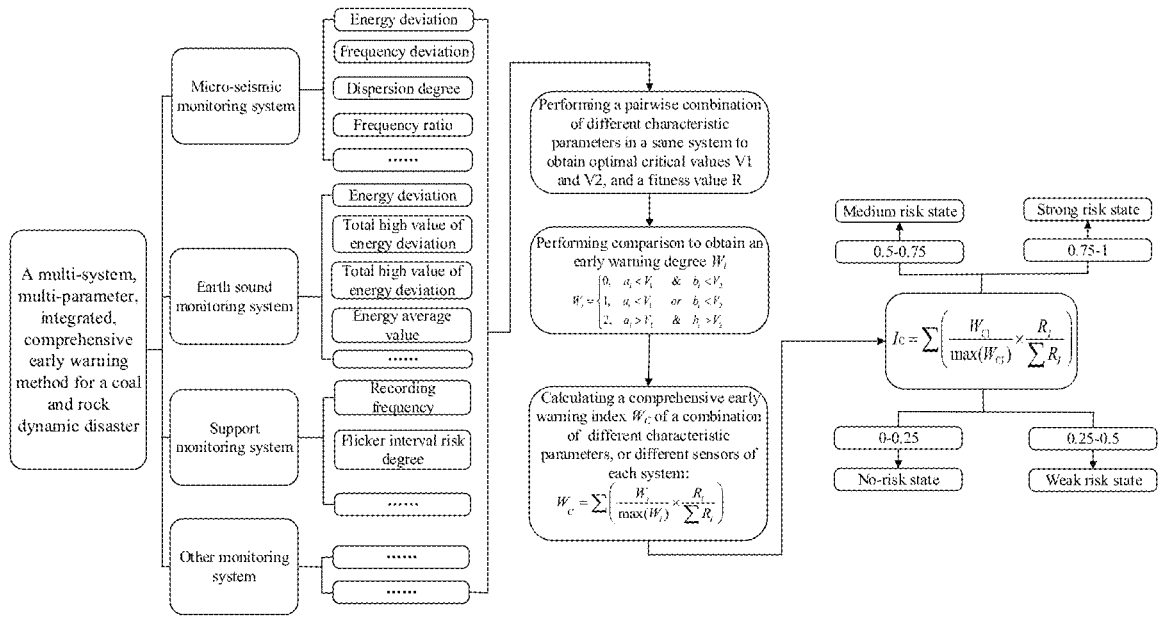
FIG. 10 is a flow chart of the multi-system multi-parameter integrated comprehensive early warning method and system for coal and rock dynamic disaster.

Referring to FIGS. 1 to 12, the present embodiment provides a multi-system, multi-parameter, integrated, comprehensive early warning method for a coal and rock dynamic disaster, as shown in FIG. 10 (wherein, the symbol " . . . " represents other continuous monitoring data or discrete monitoring data that can be read on-line in real time in each monitoring system). The method includes the following steps.

S101: obtaining monitoring data from a plurality of monitoring systems for the coal rock dynamic disaster, and extracting multivariate characteristic parameters capable of reflecting precursor information of the coal and rock dynamic disaster in each monitoring system based on the monitoring data;

It should be noted that the above monitoring systems are the installed monitoring systems in the mine, and include on-line monitoring systems and portable monitoring systems. Specifically, the on-line monitoring systems include, but are not limited to, the micro-seismic monitoring system, the earth sound monitoring system and the hydraulic support monitoring system. The above monitoring data include the continuous monitoring data collected by the on-line monitoring systems and the discrete monitoring data collected by the portable monitoring systems. Further, the monitoring data include not only the data that can be read directly, but also the deep multivariate characteristic parameters obtained after data mining, such as time, space and intensity.

The multivariate characteristic parameters are time, space and intensity, which include but are not limited to:

in the micro-seismic monitoring system, a frequency, a frequency ratio and a frequency deviation which reflect the temporal order information; dispersion which reflects the spatial information; micro-seismic energy, a micro-seismic energy deviation and dispersion which reflect the intensity information;

in the earth sound monitoring system, earth sound energy, an earth sound energy deviation, an earth sound energy average value and a pulse factor, which reflect the intensity information; a pulse which reflects the temporal order information; and in the hydraulic support monitoring system, a flicker interval risk degree which reflects the temporal order information; a recording frequency and support pressure which reflect the intensity information.

Specifically, the above multivariate characteristic parameters are calculated as follows.

The value of the frequency ratio P (t) is calculated by the following formula:

$$P(t) = \frac{a(t)}{b(T)}$$

wherein, a(t) represents an average frequency in the $n^{th}$ hour (e.g. 8 hours) before the occurrence of the large energy event, and b(T) represents an average frequency in the n days (e.g. 2 days) before the large energy event.

The value of the frequency deviation $D_P(t)$ is calculated by the following formula:

$$D_P(t) = \frac{N(t) - \overline{N(T)}}{\overline{N(T)}}$$

wherein, N(t) represents a number of micro-seismic events on that day, and $\overline{N(T)}$ represents an average daily frequency of the micro-seismic events between two large-energy mine earthquake events (such as, energy >$10^6$ J).

The value of the dispersion Q(t) is calculated by the following formula:

$$Q(t) = lg\left(\frac{T_E(t)}{L_E(t)} + 1\right)$$

wherein, $T_E(t)$ is a sum of maximum energy and median energy in a period of time; $L_E(t)$ is micro-seismic critical characteristic energy. The calculation steps for the dispersion are as follows:

(1) calculating a weighted average distance d of the locations of all micro-seismic events occurring in a recent period of time (e.g. the first 8 hours):

$$d = \sqrt{\frac{\sum w_i(x_i - \overline{x})^2 + w_i(y_i - \overline{y})^2 + w_i(z_i - \overline{z})^2}{\sum w_i}}$$

wherein, a total of n micro-seismic events occurred in the recent period of time. The average values of x, y and z refer to the average values of the n micro-seismic events, and for an $i^{th}$ micro-seismic event, their coordinates are $x_i$, $y_i$ and $z_i$. $w_i$ is a root value of the energy of the $i^{th}$ micro-seismic event.

(2) ranking the calculated weighted average distance of the historical locations of micro-seismic events from small to large;

(3) finding out the serial number of the weighted average distance respectively corresponding to the locations $a_1$, $a_2$, $a_3$, $a_4$ . . . $a_x$, and then rounding down to obtain the serial numbers corresponding to x weighted average distances (wherein x can be 7, and the corresponding $a_i$ values can be 1.2%, 7.04%, 27.5%, 80.84%, 88.51%, 94.84%, 98.34%);

(4) arranging all the characteristic energy points within a certain range (within one meter) of the left radius and right radius of each weighted average distance obtained above in the order from small to large;

(5) extracting the characteristic energy points within a certain range around each weighted average distance, wherein the number of the range is the same as x in step (3), the corresponding range can take all the values in (40%-45%), (45%-50%), (98%-99%), (98%-99%), (98%-99%), (90%-98%) and (85%-90%); calculating the average value of the extracted characteristic energy points to obtain the critical characteristic energy point, so as to obtain the critical characteristic energy $L_E(t)$;

(6) finding out the weighted average distance corresponding to the critical characteristic energy $L_E(t)$, that is, finding out x points in the coordinate system corresponding to the weighted average distance and the characteristic energy, and using the interpolation method to get the critical characteristic energy curve;

(7) substituting the data into $$Q(t) = lg\left(\frac{T_E(t)}{L_E(t)} + 1\right)$$

to obtain the dispersion.

The value of the micro-seismic energy deviation $D_E(t)$ is calculated by the following formula:

$$D_E(t) = \frac{E(t) - \overline{E(T)}}{\overline{E(T)}}$$

wherein, E(t) represents energy of the micro-seismic event at a t moment, and $\overline{E(T)}$ represents average energy of each micro-seismic event between two large-energy mine earthquake events (such as, energy >$10^6$J).

The value of the earth sound energy deviation is calculated by the following formula:

$$D(t) = \frac{P(t) - \overline{P(T(t))}}{\overline{P(T(t))}}$$

wherein, $$\overline{P(T(t))} = \frac{\sum_{1}^{n} P(T(t))|_{t \in T(t)}}{n},$$

P(t) is a time window length obtained by dividing a cumulative sum of the parameters by a period of time (e.g. 10 minutes), T(t) represents a time interval which is related to the t moment, wherein T(t) is the time interval from a time (e.g. 24 hours) before the t moment to the t moment, and n is a number of earth sound weighted energy in the time interval T(t).

The earth sound energy average value $A_E$ is average energy within a given time (e.g. 6 hours).

The value of the pulse factor P is calculated by the following formula:

$$P = \frac{10 \sum_{i=1}^{n/10} E_i}{\sum_{i}^{n} E_i}$$

wherein, n is a number of a certain time window (e.g. 10 min) in a recent period of time (e.g. 6 hours); the calculation method of $$10 \sum_{i=1}^{n/10} E_i$$

is as follows: the cumulative energy value of the earth sound in the certain time window (e.g. 10 min) of the recent period of time (e.g. 6 hours) is arranged from large to small, which is the average value of the first n/10 numbers (rounded down) and $$\sum_{i=1}^{n} E_i$$

is the average value of the cumulative energy value of the earth sound in the certain time window (e.g. 10 min) of the recent period of time (e.g. 6 hours).

The recording frequency H is an acquisition frequency of the support pressure in the recent period of time (e.g. 6 hours).

The calculation method of the flicker interval risk degree is as follows:

$$I = \frac{1}{t_2 - t_1},$$

wherein, $t_1$ represents a time of a previous flicker and $t_2$ represents a time of a subsequent flicker; the flicker is recorded as follows; an average pressure value over a period of time (e.g. 2 days) is recorded as an average value, and if the subsequent pressure data decreases from higher than the average value to below a certain range (which can be 1/10 of the average value) of the average value, and rises to above the average value again, then one flicker is recorded.

S102: screening out a combination of characteristic parameters with a highest early warning effectiveness in each monitoring system and an optimal critical value of each characteristic parameter based on the multivariate characteristic parameters.

It should be noted that, in the present embodiment, the above step specifically adopts a genetic algorithm to train and select the combination of the characteristic parameters with the highest early warning effectiveness in each monitoring system and the corresponding optimal critical value.

Specifically, the genetic algorithm is an algorithm that performs a guided process in the target space to search for the optimal solution, which imitates the mechanism of biological evolution in nature. The genetic algorithm has the inherent characteristics of simultaneous optimization of multi-parameters and multi-combinations, and can directly operate on structural objects, without the limitation of derivatives and function continuity. The essence of the genetic algorithm is to make use of the mechanism of "survival of the fittest" in nature, and finally screens out the samples with high fitness to the environment through iterative genetic operations such as selection, crossover and mutation. Furthermore, the genetic algorithm adopts the probabilistic optimization method and uses the evaluation information of the fitness function instead of the objective function of the traditional derivative, and there is no requirement for the objective function in form thereof, so it has good fitness and large-scale characteristics.

Specifically, in the present embodiment, the process of adopting the genetic algorithm to train and select the combination of the characteristic parameters with the highest early warning effectiveness in each monitoring system and the corresponding optimal critical value includes:

(1) performing a pairwise combination on characteristic parameters belonging to different dimensions in the same monitoring system, that is, performing a combination of the characteristic parameters belonging to three different dimensions of time, space and intensity in each monitoring system;

(2) adopting the genetic algorithm to train and select a combination of the characteristic parameters with the highest fitness value in each monitoring system, and calculating the optimal critical value of each characteristic parameter;

(3) taking the combination of the characteristic parameters with the highest fitness value in each monitoring system as the combination of the characteristic parameters with the highest early warning effectiveness corresponding to each monitoring system.

Figure 11:
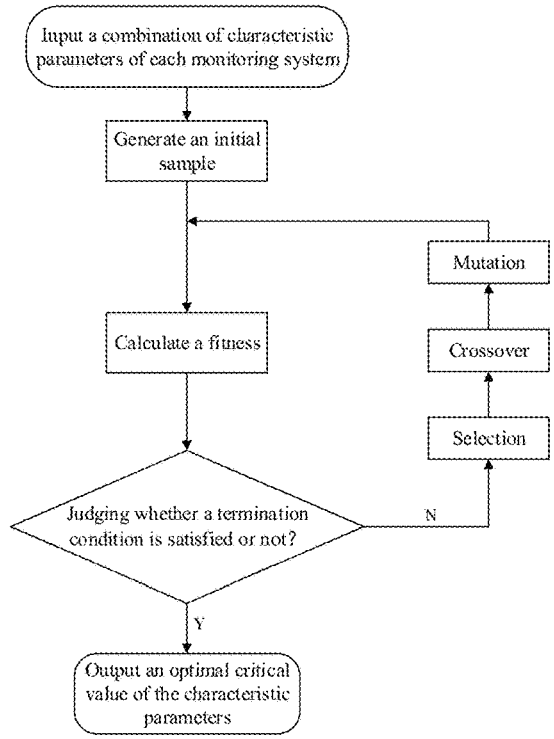
FIG. 11 is a flow chart of calculating an optimal critical value by the genetic algorithm of the present invention.

Further, the above process of adopting the genetic algorithm to train and select the combination of the characteristic parameters with the highest fitness value in each monitoring system and calculating the optimal critical value is shown in FIG. 11, including:

(i) inputting a combination of characteristic parameters of each monitoring system;

(ii) generating an initial sample according to the data input by step (i);

(iii) using the fitness function of the genetic algorithm to calculate the fitness;

(iv) judging whether the termination condition set in the genetic algorithm is satisfied or not according to the fitness calculated in step (iii);

(v) if the judgment of step (iv) satisfies the termination condition, then outputting the optimal critical value of the characteristic parameters; if the judgment of step (iv) does not satisfy the termination condition, then proceeding to step (vi); and (vi) re-obtaining the initial sample generated by performing the selection, crossover and mutation in turn in step (ii), retaining the individual with the highest fitness value and at the same time eliminating the individual with the low fitness value, so as to generate a new sample, and then returning to step (iii) for calculation until the termination condition is satisfied.

Specifically, in the above step (iii), the fitness function of the genetic algorithm adopts an R-value evaluation method. The R-value evaluation method is a method proposed by Geophysics Institute in the 1970s to evaluate the effectiveness of earthquake prediction, which is clear and easy to operate, and neither false alarm nor underreporting is encouraged, which have been widely used in earthquake prediction for decades and achieved good results. The R-value evaluation method is shown as the following formula:

$$R = \frac{n_1^1}{N_1} - \frac{n_0^1}{N_0}$$

wherein, $n_1^1$ represents a number of times that early warnings are generated and alarmed rightly; $N_1$ represents a total number of times of events with large energy or shock; $n_0^1$ represents a number of times that early warnings are generated but alarmed falsely; $N_0$ represents a total number of events without large energy or large shock, wherein the event with large energy refers to a micro-seismic event with energy greater than $10^5 J$ and the event with shock refers to an event that a shock occurs. It is defined that if the value of characteristic parameter exceeds the optimal critical value within two days before the event with shock or large energy, the early warning is right, otherwise the early warning is false. The accuracy of the early warning is increased as the R-value approaches 1. The combination of characteristic parameters a and b with the largest fitness value R and their corresponding optimal critical values $V_1$ and $V_2$ are selected.

Figure 12:
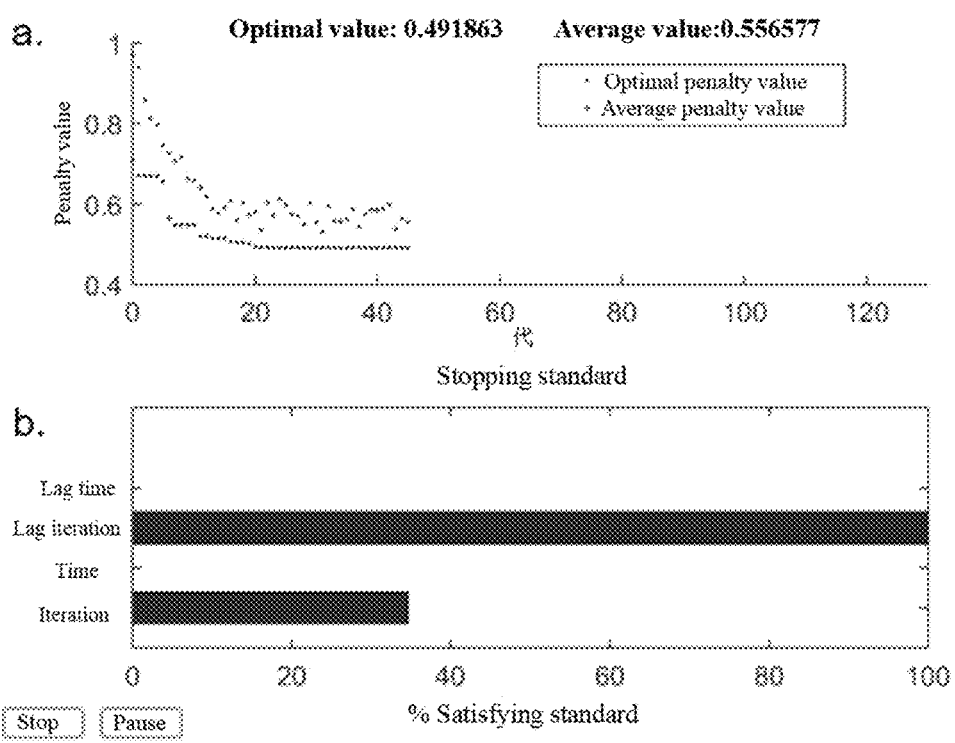
FIG. 12 is an operation process diagram of the genetic algorithm adopted by the present invention in the Matrix Laboratory (MATLAB) ver. 2014b.

The running process of the genetic algorithm in the MATLAB ver. 2014b is shown in FIG. 12, wherein a is a penalty value (1-fitness value) of the fitness function in each iteration; b is a number of iterations.

In addition, when the genetic algorithm is adopted to train and select the combination of the characteristic parameters with the highest fitness value in each monitoring system, for the micro-seismic monitoring system, since the micro-seismic monitoring system monitors the micro-seismic events in the whole mining area and all probes comprehensively collect a set of monitoring results, it is required to select the first two groups of the combination of the characteristic parameters with the highest fitness value; and for the earth sound monitoring system and the hydraulic support monitoring system, since they collect monitoring information in different ranges, respectively, and each sensor has a set of monitoring results, one group of the combination of the characteristic parameters with the highest fitness value corresponding to each sensor is selected.

S103: calculating a comprehensive early warning index and an early warning effectiveness of each monitoring system based on the combination of the characteristic parameters with the highest early warning effectiveness in each monitoring system and the optimal critical value of each characteristic parameter.

It should be noted that in the present embodiment, the above step specifically includes:

(1) based on the combination of the characteristic parameters with the highest fitness value in each monitoring system and the optimal critical value of each characteristic parameter, calculating a single system early warning degree of each monitoring system according to the following formula:

$$W_i = \begin{cases} 0, & a_i < V_1 \ \& \ b_i < V_2 \\ 1, & a_i < V_1 \ \text{or} \ b_i < V_2 \\ 2, & a_i > V_1 \ \& \ b_1 > V_2 \end{cases}$$

wherein, for the micro-seismic monitoring system, the single system early warning degree is an early warning degree of each group of the combination of the characteristic parameters with the highest fitness value, wherein, $W_i$ represents an early warning degree of an $i^{th}$ group of the combination of the characteristic parameters with the highest fitness value, $a_i$ and $b_i$ represent the real-time values of two characteristic parameters in the $i^{th}$ group of the combination of the characteristic parameters with the highest fitness value, respectively, and $V_1$ and $V_2$ represent the optimal critical values corresponding to each characteristic parameter in the $i^{th}$ group of the combination of the characteristic parameters with the highest fitness value, respectively;

for the earth sound monitoring system and the hydraulic support monitoring system, the single system early warning degree is an early warning degree of each sensor, wherein, $W_i$ represents an early warning degree of an $i^{th}$ sensor, $a_i$ and $b_i$ represent the real-time values of two characteristic parameters in the combination of the characteristic parameters with the highest fitness value corresponding to the $i^{th}$ sensor, respectively, and $V_1$ and $V_2$ represent the optimal critical values corresponding to each characteristic parameter in the combination of the characteristic parameters with the highest fitness value corresponding to the $i^{th}$ sensor, respectively;

(2) based on the single system early warning degree of each monitoring system, calculating a comprehensive early warning index $W_C$ of each monitoring system according to the following formula:

$$W_C = \sum \left( \frac{W_i}{\max(W_i)} \times \frac{R_i}{\sum R_i} \right)$$

wherein, for the micro-seismic monitoring system, $R_i$ represents a fitness value of the $i^{th}$ group of the combination of the characteristic parameters with the highest fitness value; for the earth sound monitoring system and the hydraulic support monitoring system, $R_i$ represents a fitness value of the combination of the characteristic parameters with the highest fitness value corresponding to the $i^{th}$ sensor;

(3) based on the comprehensive early warning index of each monitoring system, calculating an early warning effectiveness $R_I$ of each monitoring system by the R-value evaluation method according to the following formula, wherein $R_I$ represents an early warning effectiveness of an $I^{th}$ monitoring system:

$$R_I = \frac{n_1^1}{N_1} - \frac{t_0}{T_0}$$

wherein, $n_1^1$ represents the number of times that early warnings are generated and alarmed rightly in a monitoring time; $N_1$ represents a total number of times of events with large energy or shock in the monitoring time; $t_0$ is time taken to generate an early warning; $T_0$ is total monitoring time; when the comprehensive early warning index corresponding to the monitoring system exceeds a preset threshold within the preset days before the event with large energy or shock occurs, the early warning is right, otherwise, the early warning is false.

Specifically, the present embodiment defines that if the value of the $W_C$ exceeds 0.5 within 2 days before the event with large energy or shock occurs, the early warning is right, otherwise, the early warning is false; and the duration of each early warning is 2 days.

S104: calculating a multi-system comprehensive early warning result of the coal and rock dynamic disaster based on the comprehensive early warning index and the early warning effectiveness of each monitoring system.

It should be noted that in the present embodiment, the above step specifically includes:

calculating the multi-system comprehensive early warning result $I_C$ of the coal and rock dynamic disaster according to the following formula:

$$I_C = \sum \left( \frac{W_{CI}}{\max(W_{CI})} \times \frac{R_I}{\sum R_I} \right)$$

wherein, $W_{CI}$ represents a comprehensive early warning index of the $I^{th}$ monitoring system, and $R_I$ represents an early warning effectiveness of the $I^{th}$ monitoring system.

Further, after S104, the method of the present embodiment further includes:

S105, comparing the multi-system comprehensive early warning result of the coal and rock dynamic disaster with a classification early warning evaluation criteria of the coal and rock dynamic disasters to determine a risk level of the dynamic disaster.

It should be noted that in the present embodiment, the risk level determined by the above step according to the comparison result is: when $0 \leq I_C \leq 0.25$, it is in a no-risk state; when $0.25 < I_C \leq 0.5$, it is in a weak risk state; when $0.5 < I_C \leq 0.75$, it is in a medium risk state; when $0.75 < I_C \leq 1$, it is in a strong risk state.

According to the early warning result of the present invention, corresponding measures can be taken according to Table 1.

TABLE 1 risk state classification table of the coal and rock dynamic disasters

| Risk Level | $W_C$ | Risk State | Measures Taken |
|---|---|---|---|
| I-level | $0 \leq I_C \leq 0.25$ | No risk state | Carrying out design and production operations normally under the mine. |
| II-level | $0.25 \leq I_C \leq 0.5$ | Weak risk state | 1. Arranging necessary monitoring, inspection and control equipment; 2. Making the monitoring and control plan, and carrying out the risk monitoring, risk removing and effect test of rock burst during the operation. |
| III-level | $0.5 \leq I_C \leq 0.75$ | Medium risk state | 1. Arranging complete regional and local monitoring and inspection equipment and control equipment; 2. Carrying out a pre-pressure relief measure on the support pressure affected area and rock mass side of the coal mining face before state operation. 3. Regulating personnel restriction areas and determining disaster escape routes 4. Making the monitoring and control plan, and carrying out the risk monitoring, risk removing and effect test of rock burst during the operation. |
| IV-level | $0.75 \leq I_C \leq 1$ | Strong risk state | 1. Arranging complete regional and local monitoring and inspection equipment and control equipment; 2. Carrying out a pre-pressure relief measure on the coal seam, the head-on side, and the rear side of the mining roadway in the coal mining face, and then carrying out the operation only after the risk of rock burst is removed; 3. making the monitoring and control plan, and strengthening the risk monitoring, risk removing and effect test of rock burst during the operation; monitoring the disturbance influence on surrounding roadway and chamber, and making corresponding control measures; 4. Setting up escape chambers, personnel restricted areas, and determining disaster escape routes. |

In conjunction with the specific application scenario, the method of the present embodiment is further described below.

A certain working face of a certain mine is selected, and the micro-seismic monitoring system, the earth sound monitoring system and the hydraulic support monitoring system are arranged near the working face, respectively. The early warning steps are as follows.

(1) The historical monitoring data of each monitoring system of the coal and rock dynamic disaster in the mine are collected and analyzed, so as to extract the multivariate characteristic parameters (time, space and intensity) capable of reflecting the precursor information of the coal and rock dynamic disaster in each monitoring system, which includes the dispersion, the frequency ratio, the energy deviation and the frequency deviation in the micro-seismic monitoring system; the energy average value and the pulse factor in the earth sound monitoring system; and the flicker interval risk degree and the recording frequency in the hydraulic support monitoring system. Specifically, the dispersion is the characteristic parameter based on the spatial dimension. The possibility of causing the shock event later increases as the dispersion of the source position of the micro-seismic event in a period of time decreases. The frequency ratio and the frequency deviation are the characteristic parameters of the time dimension. The occurrence frequency of micro-seismic events before the shock event is lower than that before, and the phenomenon of "quiet period" appears, which leads to the accumulation of energy for greater damage in the later stage. The energy average value and the energy deviation are the characteristic parameters of the intensity dimension. The internal fracture phenomenon of the coal and rock mass is aggravated as the energy value detected by the micro-seismic monitoring system and the earth sound monitoring system increases. The pulse factor is the characteristic parameter of the time dimension, which indicates the relative peak value of the earth sound energy. The flicker interval risk degree is the characteristic parameter of the time dimension. The rapid change in the support pressure is referred to as the flicker. The flicker can eliminate the influence caused by moving the support. The energy accumulation in coal and rock mass is aggravated as the occurrence frequency of the flicker increases. The recording frequency is the characteristic parameter of the strength dimension. The recording frequency of the hydraulic support sensor will increase when the stress in the coal and rock mass changes. The temporal order variation curves of the characteristic parameters are drawn with two months as a time window, and the results are shown in FIGS. 1-8.

The pairwise combinations of the characteristic parameters of different dimensions of each system are input into the genetic algorithm to calculate the optimal critical values $V_1$ and $V_2$ and the corresponding fitness values R, and the two groups of the combination of the characteristic parameters with the highest fitness value of the micro-seismic monitoring system are selected, which are the combination of the dispersion and the frequency ratio, the combination of the energy deviation and the frequency deviation; the combination of the energy average value (logarithm) and the pulse factor in the earth sound monitoring system, and the combination of the recording frequency and the flicker interval risk degree in the hydraulic support monitoring system, respectively. The calculation results are shown in Table 2.

TABLE 2

Calculation results of the genetic algorithm

| Monitoring system name | | Optimal combination of characteristic parameters | | Fitness value |
|---|---|---|---|---|
| | | dispersion | frequency ratio | |
| Micro-seismic monitoring system | short term | 0.060 | 1.748 | 0.590 |
| | long term | 0.469 | 1.895 | 0.457 |
| | | energy average value (logarithm) | pulse factor | |
| Earth sound monitoring system | 1# sensor | 2.600 | 2.370 | 0.650 |
| | 2# sensor | 2.040 | 1.600 | 0.333 |
| | 3# sensor | 1.790 | 5.560 | 0.540 |
| | | recording frequency | flicker interval risk degree | |
| Support monitoring system | 1# support | 11 | 0.00078 | 0.143 |
| | 2# support | 4 | 0.00001 | 0.500 |
| | 3# support | 9 | 0.00001 | 0.385 |

(3) The early warning degree $W_i$ and the comprehensive early warning index $W_C$ of each single system are calculated, and the R-value evaluation method is adopted to obtain the early warning effectiveness RI of each single system. During the historical monitoring period, a total of 9 events with shock or high energy occurred in the working face, which is numbered as ①-⑨ for convenience of expression. The success or failure of the early warning is defined as follows: if the comprehensive early warning index $W_C$ exceeds 0.5 within 3 days before the event with shock or high energy occurs, the early warning is successful, otherwise, the early warning fails. The calculation results are shown in Table 3 below.

TABLE 3

Comprehensive early warning index $W_C$ and early warning effectiveness RI of a single system

| Monitoring system name | Comprehensive early warning index $W_C$ of events with shock or high energy corresponding to each monitoring system | | | | | | | | | Early warning effectiveness RI |
|---|---|---|---|---|---|---|---|---|---|---|
| | ① | ② | ③ | ④ | ⑤ | ⑥ | ⑦ | ⑧ | ⑨ | |
| Micro-seismic monitoring system | 1.00 | 0.78 | 1.00 | 1.00 | 1.00 | 1.00 | 1.00 | 1.00 | 0.72 | 0.49 |
| Earth sound monitoring system | 1.00 | 1.00 | 1.00 | 0.53 | 0.66 | 0.87 | 0.87 | 0.80 | 0.72 | 0.77 |
| Support monitoring system | 0.60 | 0.81 | 0.00 | 1.00 | 1.00 | 1.00 | 1.00 | 1.00 | 1.00 | 0.73 |

Before the event with shock or large energy occurs, the comprehensive early warning index $W_C$ of each system basically reaches the early warning standard, and the early warning result is accurate and has a certain reference value.

(4) According to the calculation results of Table 3 in step (3), the result of the multi-system comprehensive early warning result of the coal and rock dynamic disaster in the mine is calculated. The results are drawn with two months as the time window and shown in FIG. 7.

(5) The multi-system comprehensive early warning result $I_C$ is compared with the classification early warning evaluation criteria of the coal and rock dynamic disasters to determine the risk level: when $0 \leq I_C \leq 0.25$, it is in the no-risk state; when $0.25 < I_C \leq 0.5$, it is in the weak risk state; when $0.5 < I_C \leq 0.75$, it is in the medium risk state; when $0.75 < I_C \leq 1$, it is in the strong risk state.

The method of the present embodiment uses the result of the multi-system comprehensive early warning as the early warning index to carry out the risk early warning of the coal and rock dynamic disasters in a large area of monitoring, and realizes the multi-system multi-parameter integrated spatio-temporal comprehensive early warning. According to the method, the accuracy is high, the operation is simple, and the programming operation can be realized, which lays a foundation for the efficient early warning of the coal and rock dynamic disasters.

Second Embodiment

The embodiment provides a multi-system multi-parameter integrated comprehensive early warning system for a coal and rock dynamic disaster, wherein the multi-system, multi-parameter, integrated, comprehensive early warning system for the coal and rock dynamic disaster includes:

a multivariate characteristic parameter extracting module, configured to obtain monitoring data of a plurality of monitoring systems for the coal rock dynamic disaster, and extract multivariate characteristic parameters capable of reflecting precursor information of the coal and rock dynamic disaster in each monitoring system based on the monitoring data;

a characteristic parameter combination screening module, configured to screen out a combination of characteristic parameters with a highest early warning effectiveness in each monitoring system and an optimal critical value of each characteristic parameter based on the multivariate characteristic parameters;

a single system early warning index and early warning effectiveness calculation module, configured to calculate a comprehensive early warning index and an early warning effectiveness of each monitoring system based on the combination of the characteristic parameters with the highest early warning effectiveness in each monitoring system and the optimal critical value of each characteristic parameter; and a comprehensive early warning result calculation module, configured to calculate a multi-system comprehensive early warning result of the coal and rock dynamic disaster based on the comprehensive early warning index and the early warning effectiveness of each monitoring system.

Further, in the present embodiment, the multi-system multi-parameter integrated comprehensive early warning system for the coal and rock dynamic disaster further includes: a dynamic disaster risk level determination module, configured to compare the multi-system comprehensive early warning result of the coal and rock dynamic disaster with a classification early warning evaluation criteria of the coal and rock dynamic disasters to determine a risk level of the dynamic disaster.

The multi-system multi-parameter integrated comprehensive early warning system for the coal and rock dynamic disaster of the present embodiment corresponds to the multi-system multi-parameter integrated comprehensive early warning method for the coal and rock dynamic disaster of the above first embodiment. Specifically, the role of each module in the multi-system multi-parameter integrated comprehensive early warning system for the coal and rock dynamic disaster corresponds to the steps of the multi-system multi-parameter integrated comprehensive early warning method for the coal and rock dynamic disaster, therefore not repeat them here.

In addition, it should be noted that those skilled in the art should understand that the embodiments of the present invention may be provided as methods, devices, or computer program products. Therefore, the embodiments of the present invention may take the form of complete hardware, complete software, or a combination of software and hardware. Furthermore, the embodiments of the present invention may take the form of a computer program product implemented on one or more computer available storage media (including, but not limited to, a disk memory, a compact disc read-only memory (CD-ROM), an optical memory, etc.) containing computer available program codes.

The embodiments of the present invention are described with reference to a method, a terminal device (system), and a flow chart and/or block diagram of a computer program product according to the embodiments of the present invention. It should be understood that each flow and/or block in the flow chart and/or block diagram, as well as the combination of the flow and/or block in the flow chart and/or block diagram, can be implemented by computer program instructions. These computer program instructions may be input into a processor of a general purpose computer, embedded processor or other programmable data processing terminal device to generate a machine, such that instructions executed by the processor of the computer or other programmable data processing terminal device generate a device for performing a function specified in one flow or a plurality of flows in a flow chart, or one block or a plurality of blocks in a block diagram.

These computer program instructions can also be stored in a computer-readable memory capable of guiding a computer or other programmable data processing terminal device to work in a specific manner, so that the instructions stored in the computer-readable memory generate a manufactured good including an instruction device, and the instruction device performs the function specified in one flow or a plurality of flows in a flow chart, or one block or a plurality of blocks in a block diagram. These computer program instructions can also be loaded on a computer or other programmable data processing terminal device so that a series of operating steps are performed on the computer or other programmable terminal devices to produce the computer-realized processing. Therefore, the instructions executed on a computer or other programmable terminal devices provide steps for implementing the function specified in one flow or a plurality of flows in a flow chart, or one block or a plurality of blocks in a block diagram.

It also should be noted that in the present application, the term "include", "contain", or any other similar terms are intended to cover non-exclusive inclusion, so that a process, method, article, or terminal device that includes a series of elements includes not only those elements, but also other elements that are not explicitly listed, or elements inherent in such the process, method, article, or terminal device. Without more restrictions, the elements defined by the expression "include(s) a . . . " do not exclude that there are other identical elements in the process, method, article or terminal device including the elements.

The above description is only preferred embodiments of the present invention. It should be noted that, for those skilled in the art, once the basic inventive concept of the present invention is known, without departing from the principles described in the present invention, several changes and modifications can be made to these embodiments of the present invention, and these changes and modifications shall within the scope of protection of the present invention. Therefore, the appended claims are intended to be construed as including the preferred embodiments and all changes and modifications that fall within the scope of the embodiments of the invention.

The invention claimed is:

1. A multi-system, multi-parameter, integrated, comprehensive early warning method for a coal and rock dynamic disaster, comprising:
obtaining monitoring data from a plurality of monitoring systems for the coal rock dynamic disaster, and extracting multivariate characteristic parameters in each monitoring system based on the monitoring data, wherein the multivariate characteristic parameters reflect precursor information of the coal and rock dynamic disaster;
screening out a combination of characteristic parameters with a highest early warning effectiveness in each monitoring system and an optimal critical value of each characteristic parameter based on the multivariate characteristic parameters;
calculating a comprehensive early warning index and an early warning effectiveness of each monitoring system based on the combination of the characteristic parameters with the highest early warning effectiveness in each monitoring system and the optimal critical value of each characteristic parameter; and
calculating a multi-system comprehensive early warning result of the coal and rock dynamic disaster based on the comprehensive early warning index and the early warning effectiveness of each monitoring system.

2. The multi-system, multi-parameter, integrated, comprehensive early warning method for the coal and rock dynamic disaster according to claim 1, wherein after calculating the multi-system comprehensive early warning result of the coal and rock dynamic disaster, the method further comprises:
comparing the multi-system comprehensive early warning result of the coal and rock dynamic disaster with a classification early warning evaluation criteria of coal and rock dynamic disasters to determine a risk level of the coal and rock dynamic disaster.

3. The multi-system, multi-parameter, integrated, comprehensive early warning method for the coal and rock dynamic disaster according to claim 1, wherein the plurality of monitoring systems comprise on-line monitoring systems and portable monitoring systems, the on-line monitoring systems comprise a micro-seismic monitoring system, an earth sound monitoring system and a hydraulic support monitoring system.

4. The multi-system, multi-parameter, integrated, comprehensive early warning method for the coal and rock dynamic disaster according to claim 3, wherein the monitoring data comprise continuous monitoring data collected by the on-line monitoring systems and discrete monitoring data collected by the portable monitoring systems.

5. The multi-system, multi-parameter, integrated, comprehensive early warning method for the coal and rock dynamic disaster according to claim 4, wherein dimensions of the multivariate characteristic parameters comprise a time dimension, a space dimension and an intensity dimension;
the multivariate characteristic parameters in the micro-seismic monitoring system comprise:
a frequency, a frequency ratio and a frequency deviation, wherein the frequency, the frequency ratio and the frequency deviation reflect temporal order information;
a first dispersion, wherein the first dispersion reflects spatial information; and
micro-seismic energy, a micro-seismic energy deviation and a second dispersion, wherein the micro-seismic energy, the micro-seismic energy deviation and the second dispersion reflect intensity information;
the multivariate characteristic parameters in the earth sound monitoring system comprise:
earth sound energy, an earth sound energy deviation, an earth sound energy average value and a pulse factor, wherein the earth sound energy, the earth sound energy deviation, the earth sound energy average value and the pulse factor reflect the intensity information; and
a pulse, wherein the pulse reflects the temporal order information; and
the multivariate characteristic parameters in the hydraulic support monitoring system comprise:
a flicker interval risk degree, wherein the flicker interval risk degree reflects the temporal order information; and
a recording frequency and support pressure, wherein the recording frequency and the support pressure reflect the intensity information.

6. The multi-system, multi-parameter, integrated, comprehensive early warning method for the coal and rock dynamic disaster according to claim 5, wherein the step of screening out the combination of the characteristic parameters with the highest early warning effectiveness in each monitoring system and the optimal critical value of each characteristic parameter comprises:
performing a pairwise combination on two of characteristic parameters belonging to different dimensions in a same monitoring system;
adopting a genetic algorithm to train and select a combination of characteristic parameters with a highest fitness value in each monitoring system, and calculating the optimal critical value of each characteristic parameter of the characteristic parameters with the highest fitness value; and
taking the combination of the characteristic parameters with the highest fitness value in each monitoring system as the combination of the characteristic parameters with the highest early warning effectiveness corresponding to each monitoring system.

7. The multi-system, multi-parameter, integrated, comprehensive early warning method for the coal and rock dynamic disaster according to claim 6, wherein when the genetic algorithm is adopted to train and select the combination of the characteristic parameters with the highest fitness value in each monitoring system, first two groups of the combination of the characteristic parameters with the highest fitness value are selected in the micro-seismic monitoring system; and one group of the combination of the characteristic parameters with the highest fitness value corresponding to each sensor is selected in the earth sound monitoring system and the hydraulic support monitoring system.

8. The multi-system, multi-parameter, integrated, comprehensive early warning method for the coal and rock dynamic disaster according to claim 7, wherein the step of calculating the comprehensive early warning index and the early warning effectiveness of each monitoring system based on the combination of the characteristic parameters with the highest early warning effectiveness in each monitoring system and the optimal critical value of each characteristic parameter comprises:

based on the combination of the characteristic parameters with the highest fitness value in each monitoring system and the optimal critical value of each characteristic parameter, calculating a single system early warning degree of each monitoring system according to the following formula:

$$W_i = \begin{cases} 0, & a_i < V_1 \ \& \ b_i < V_2 \\ 1, & a_i < V_1 \ \text{or} \ b_i < V_2 \\ 2, & a_i > V_1 \ \& \ b_1 > V_2 \end{cases}$$

in the micro-seismic monitoring system, the single system early warning degree is an early warning degree of each group of the combination of the characteristic parameters with the highest fitness value, wherein $W_i$ represents an early warning degree of an $i^{th}$ group of the combination of the characteristic parameters with the highest fitness value, $a_i$ represents a real-time value of a first characteristic parameter in the $i^{th}$ group of the combination of the characteristic parameters with the highest fitness value, $b_i$ represents a real-time value of a second characteristic parameter in the $i^{th}$ group of the combination of the characteristic parameters with the highest fitness value, $V_1$ represents a first optimal critical value corresponding to the first characteristic parameter in the $i^{th}$ group of the combination of the characteristic parameters with the highest fitness value; and $V_2$ represents a second optimal critical value corresponding to the second characteristic parameter in the $i^{th}$ group of the combination of the characteristic parameters with the highest fitness value;

in the earth sound monitoring system and the hydraulic support monitoring system, the single system early warning degree is an early warning degree of each sensor, wherein, $W_i$ represents an early warning degree of an $i^{th}$ sensor, $a_i$ represents a real-time value of a first characteristic parameter in the combination of the characteristic parameters with the highest fitness value corresponding to the $i^{th}$ sensor, respectively, $b_i$ represents a real-time value of a second characteristic parameter in the combination of the characteristic parameters with the highest fitness value corresponding to the $i^{th}$ sensor, $V_1$ represents a third optimal critical value corresponding to a third characteristic parameter in the combination of the characteristic parameters with the highest fitness value corresponding to the $i^{th}$ sensor, $V_2$ represents a fourth characteristic parameter in the combination of the characteristic parameters with the highest fitness value corresponding to the $i^{th}$ sensor;

based on the single system early warning degree of each monitoring system, calculating a comprehensive early warning index $W_C$ of each monitoring system according to the following formula:

$$W_C = \sum \left( \frac{W_i}{\max(W_i)} \times \frac{R_i}{\sum R_i} \right)$$

wherein in the micro-seismic monitoring system, $R_i$ represents a fitness value of the $i^{th}$ group of the combination of the characteristic parameters with the highest fitness value;

in the earth sound monitoring system and the hydraulic support monitoring system, $R_i$ represents a fitness value of the combination of the characteristic parameters with the highest fitness value corresponding to the $i^{th}$ sensor; and based on the comprehensive early warning index of each monitoring system, calculating an early warning effectiveness RI of each monitoring system according to the following formula, wherein RI represents an early warning effectiveness of an $I^{th}$ monitoring system:

$$R_I = \frac{n_1^1}{N_1} - \frac{t_0}{T_0}$$

wherein, $n_1^1$ represents a number of times of early warnings generated and alarmed rightly in a monitoring time; $N_1$ represents a total number of times of events with large energy or shock in the monitoring time; $t_0$ is time taken to generate an early warning; $T_0$ is total monitoring time; when the comprehensive early warning index corresponding to one of the plurality of monitoring systems exceeds a preset threshold within preset days before an event with large energy or shock occurs, an early warning is right, and when the comprehensive early warning index corresponding to the one of the plurality of monitoring systems does not exceed the preset threshold within the preset days before the event with large energy or shock occurs, the early warning is false.

9. The multi-system, multi-parameter, integrated, comprehensive early warning method for the coal and rock dynamic disaster according to claim 8, wherein the step of calculating the multi-system comprehensive early warning result of the coal and rock dynamic disaster based on the comprehensive early warning index and the early warning effectiveness of each monitoring system comprises:

based on the comprehensive early warning index and the early warning effectiveness of each monitoring system, calculating the multi-system comprehensive early warning result $I_C$ of the coal and rock dynamic disaster according to the following formula:

$$I_C = \sum \left( \frac{W_{CI}}{\max(W_{CI})} \times \frac{R_I}{\sum R_I} \right)$$

wherein $W_{CI}$ represents the comprehensive early warning index of the $I^{th}$ monitoring system, and $R_I$ represents the early warning effectiveness of the $I^{th}$ monitoring system.

10. A multi-system, multi-parameter, integrated, comprehensive early warning system for a coal and rock dynamic disaster, comprising:
- a multivariate characteristic parameter extracting module, configured to obtain monitoring data of a plurality of monitoring systems for the coal rock dynamic disaster, and extract multivariate characteristic parameters in each monitoring system based on the monitoring data, wherein the multivariate characteristic parameters reflect precursor information of the coal and rock dynamic disaster;
- a characteristic parameter combination screening module, configured to screen out a combination of characteristic parameters with a highest early warning effectiveness in each monitoring system and an optimal critical value of each characteristic parameter based on the multivariate characteristic parameters;
- a single system early warning index and early warning effectiveness calculation module, configured to calculate a comprehensive early warning index and an early warning effectiveness of each monitoring system based on the combination of the characteristic parameters with the highest early warning effectiveness in each monitoring system and the optimal critical value of each characteristic parameter; and
- a comprehensive early warning result calculation module, configured to calculate a multi-system comprehensive early warning result of the coal and rock dynamic disaster based on the comprehensive early warning index and the early warning effectiveness of each monitoring system.

* * * * *